United States Patent [19]

Okado et al.

[11] 4,314,189
[45] Feb. 2, 1982

[54] DEVICE FOR CONTROLLING THE COMMUTATING ANGLE OF AN INVERTER DEVICE

[75] Inventors: Chihiro Okado, Fuchu; Takashi Morishita, Tokyo; Koki Hasegawa, Hino, all of Japan

[73] Assignee: Tokyo Shibaura Denki Kabushiki Kaisha, Kawasaki, Japan

[21] Appl. No.: 100,561

[22] Filed: Dec. 5, 1979

[30] Foreign Application Priority Data

Feb. 21, 1979 [JP] Japan .................................. 54-19472

[51] Int. Cl.³ ............................................. H02P 1/26
[52] U.S. Cl. ...................................... 318/732; 363/37
[58] Field of Search ............... 318/722, 802, 731, 732; 363/37, 57, 58, 138

[56] References Cited

U.S. PATENT DOCUMENTS

| | | | |
|---|---|---|---|
| 3,515,969 | 6/1970 | Magnuson et al. | 318/732 |
| 3,521,137 | 7/1970 | Sweden | 318/732 |
| 3,683,251 | 8/1972 | Pisecker | 318/732 X |
| 3,978,381 | 8/1976 | Yamamoto et al. | 318/732 |
| 4,074,174 | 2/1978 | Kuge | 318/732 |

*Primary Examiner*—William M. Shoop
*Attorney, Agent, or Firm*—Oblon, Fisher, Spivak, McClelland & Maier

[57] ABSTRACT

In a separate excitation type inverter device in which an A.C. power source is used as a commutating source, the inverter device is controlled so as to maintain a certain predetermined amplitude of the commutating voltage when the voltage of the A.C. power source is dropped or becomes unbalanced.

7 Claims, 5 Drawing Figures

DEVICE FOR CONTROLLING THE COMMUTATING ANGLE OF AN INVERTER DEVICE

BACKGROUND OF THE INVENTION

1. Field of the Invention

This invention generally relates to a device for controlling the commutating angle of a separate excitation type inverter device where the A.C. power source is used as a commutating power source such that failures in commutation are prevented in cases when the voltage of the A.C. power source drops or becomes unbalanced.

2. Description of the Prior Art

A conventional static Scherbius device as shown in FIG. 1 has been employed as, for example, a device for controlling the speed of a motor for operating a water pump. In this case, even though the A.C. voltage of the power source drops, or becomes unbalanced, it is required that the operation of the static Scherbius device continue. Therefore, it is necessary to control the commutating angle within some margins such that operation can be continued even though the voltage of the A.C. power source drops or becomes unbalanced. However, it is difficult to realize such a technique by using the prior art static Scherbius device as will be described below.

In FIG. 1, the A.C. power source 1 is connected with a wound-rotor type induction motor 3 through a circuit breaker 2. The electric power from the secondary windings of the induction motor 3 is converted to D.C. power by a rectifier 4 and then the converted D.C. power is reconverted to A.C. power by an inverter bridge circuit 6 which is coupled back to the A.C. power source 1. A smoothing reactor 5 is provided between the rectifier 4 and the inverter bridge circuit 6. Three capacitors 7 are connected to the line of the A.C. power source for power factor improvement. The output of a speed control 8 is compared with the amplitude of a speed detector 9 such as a tachometer, which is coupled with the shaft of the induction motor 3. The compared signal is supplied to a current amplifier 10 which produces a current reference signal $I_R$. The current reference signal $I_R$ of the current amplifier 10 is compared with the output of a current detector 11 which is connected between the rectifier 4 and the inverter bridge circuit 6. The compared signal is supplied through a phase amplifier 12 to a phase controlling circuit 13 which receives a synchronous signal from the A.C. power source 1 through a transformer 14 and which produces gate signals for each gate of the thyristor $SCR_1$ through $SCR_6$ of the inverter bridge circuit 6.

Consequently, the phase angle of the thyristors of the inverter bridge circuit 6 is controlled, and a so-called speed controlling circuit having a current control subloop is constituted. The portion of the circuit relating to the commutation function which operates when the input power source drops or becomes unbalanced corresponds to the phase controlling circuit 13. The phase controlling circuit 13 is explained below in detail with reference to FIG. 2.

Referring to FIG. 2, the secondary of the transformer 14 is constituted as a six-phase connection and is connected with a filter comprising a plurality of resistors 21 and a plurality of capacitors 22 for producing a 30° delay in phase angle and for the elimination of distortions and noise from the waveform of the A.C. power source. Control of the amount of lead in the phase angle ($\alpha$) is achieved by adding a sinewave signal from the A.C. power source and a controlling voltage.

In the phase controlling circuit 13 of FIG. 2, only the circuitry for one phase is shown. The two voltage signals b and e are added together in a ratio determined by the value of the resistors $R_1$ and $R_2$. The sum signal is supplied to a level detector 23 which detects a predetermined level, for example the zero point. The output signal of the level detector 23 is supplied to an AND circuit 27 which acts as a limitation of the amount of lead of the phase (the so-called $\alpha$-limit). The output signal of the phase amplifier 12 which determines the controlled phase angle and the voltage signal c from the secondary of the transformer 14 are added through resistors $R_3$ and $R_4$, respectively. The added output signal is supplied to an input terminal of an OR circuit 26 as a leading phase angle ($\alpha$)controlling signal through a level detector 24 which detects a predetermined level, for example the zero point.

On the other hand, the voltage signal f is supplied to the outer input terminal of the OR circuit 26 which functions to limit the amount of lag of the phase angle (the so called $\beta$ limit) through a resistor $R_5$ and a level detector 25 which detects a predetermined level, for example, the zero point. The output signal of the OR circuit 26 is supplied to the other input terminal of the AND circuit 27. The output signal of the AND circuit 27 is converted to a pulse signal by a one-shot circuit or monostable multivibrator circuit 28. The output signal of the one-shot circuit 28 is supplied to an input terminal of an OR circuit 29. Similarly, the pulse of the next phase is obtained from a one-shot circuit or monostable multivibrator circuit 30. Thus, two output signals of the one-shot circuits 28 and 30 are supplied to the gate of the thyristor $SCR_3$ in the inverter bridge circuit 6 through the OR circuit 29.

FIG. 3 shows the relationship between each phase shown in FIG. 2. The control of the amount of lead in the phase angle ($\alpha$) is achieved by adding the output signal of the phase amplifier 12 and the voltage signal c. Accordingly, the leading phase angle ($\alpha$) control signal is changed within the period from time $t_2$ to $t_4$ in response to the amplitude of the output signal of phase amplifier 12. But the angle of lead, $\alpha$, is limited to a range of from 10° to 20° by adding the output signal of level detector 23 and the output signal of OR circuit 26. Occasionally, the commutating voltage is maintained in which the phase leads at a maximum angle. On the other hand, in the case where the amount of lead of the phase angle ($\alpha$) is controlled at the delayed time point $t_4$, the angle of lag $\beta$, is limited so as to maintain the angle of lag to less than 20° or 30°. Occasionally, the commutating voltage is maintained in which the phase lags at a minimum angle.

The $\beta$ limiting (limiting the angle of lag), when the inverter circuit is operated, is a property determined by the impedance of the A.C. power source and the load circuit. But in general the angle of lag, $\beta$, is limited to range between 20° to 40° when the inverter is operating. However, in the case where the voltage of the A.C. power source drops abnormally, as for example, when the voltage of the phase which is conducting drops to an abnormally low voltage, as mentioned above, if the thyristor is turned on with the same phase angle of lag, $\beta$, as that of the normal state or condition, the commutating completion time becomes too short due to the dropped voltage. Occasionally a failure in in commutation will occur.

The operation in which commutation is achieved from the phase U to the phase V at the time $t_1$ of FIG. 3 will now be explained. Namely, the commutating completion time, in which the inverter bridge circuit 6 is commutated from the point B to the point A, is determined by a time-product of the voltage difference between points A and B shown in FIG. 3 and the voltage difference thereafter, as for example, the oblique portion (A-B-C) shown in FIG. 3.

If the voltage UW drops abnormally to a low voltage at the point A', since the phase angle of lag, $\beta$, is fixed at the time $t_1$, the time-product of the commutating voltage becomes long and does not finish by the point C'. Consequently, a failure in commutation will occur. Furthermore, in the case where the A.C. power source becomes unbalanced, since the $\beta$ limit angle of that phase is determined by the phase angle of another input phase, occasionally a reduction in the $\beta$ limit angle will occur.

SUMMARY OF THE INVENTION

Accordingly, it is one object of this invention to provide a new and improved unique device for controlling the commutating angle of an inverter device in which failures in commutation can be prevented by maintaining the determined commutating voltage even though the voltage of the A.C. power source drops or becomes unbalanced. Briefly, in accordance with one aspect of this invention, a device for controlling a commutating angle of an inverter device is provided which includes a circuit for converting the A.C. input power source into six phase components, two circuits for setting first and second predetermined voltage levels, two comparator circuits for comparing the six phase outputs of the converter circuit with the first and second voltage levels, an adding circuit for summing the outputs of the two comparator circuits, and a circuit means for controlling the commutating angle of the inverter device in response to the output of the adding circuit.

BRIEF DESCRIPTION OF THE DRAWINGS

A more complete appreciation of the invention will be readily obtained as the same beomes better understood by reference to the following detailed description when considered in connection with the accompanying drawings, wherein.

DETAILED DESCRIPTION OF THE PREFERRED EMBODIMENTS

Figure 4:
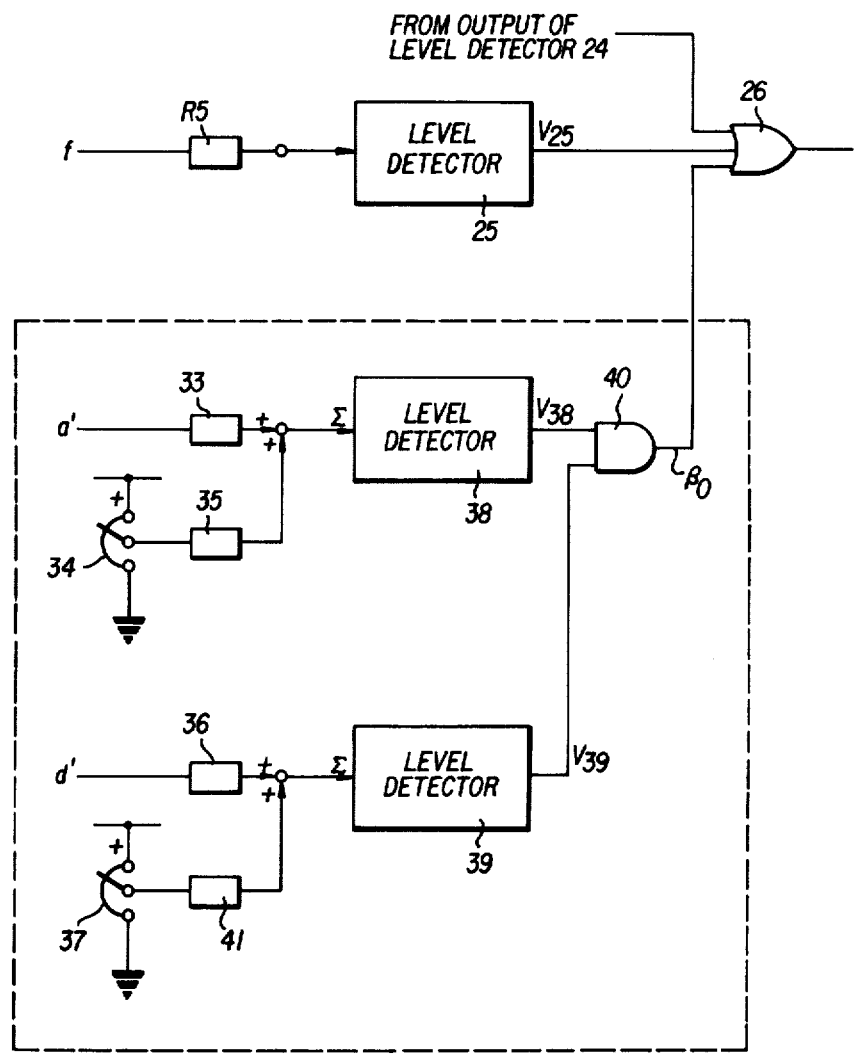
FIG. 4 is a circuit diagram of a portion of one embodiment of a device for controlling the commutating angle of an inverter device according to this invention.

Referring now to the drawings, wherein like reference numerals and characters designate identical or corresponding parts throughout the several views, and more particularly to FIG. 4 thereof, wherein a portion of one preferred embodiment of the device in accordance with this invention is shown.

Namely, as surrounded by the dotted line, a portion of the level detecting circuit for $\beta$ (angle of lag) limit is constructed in accordance with this invention. Therefore, the $\beta$ (angle of lag) limit angle is adjusted so as to maintain a predetermined commutating voltage.

Figure 1:
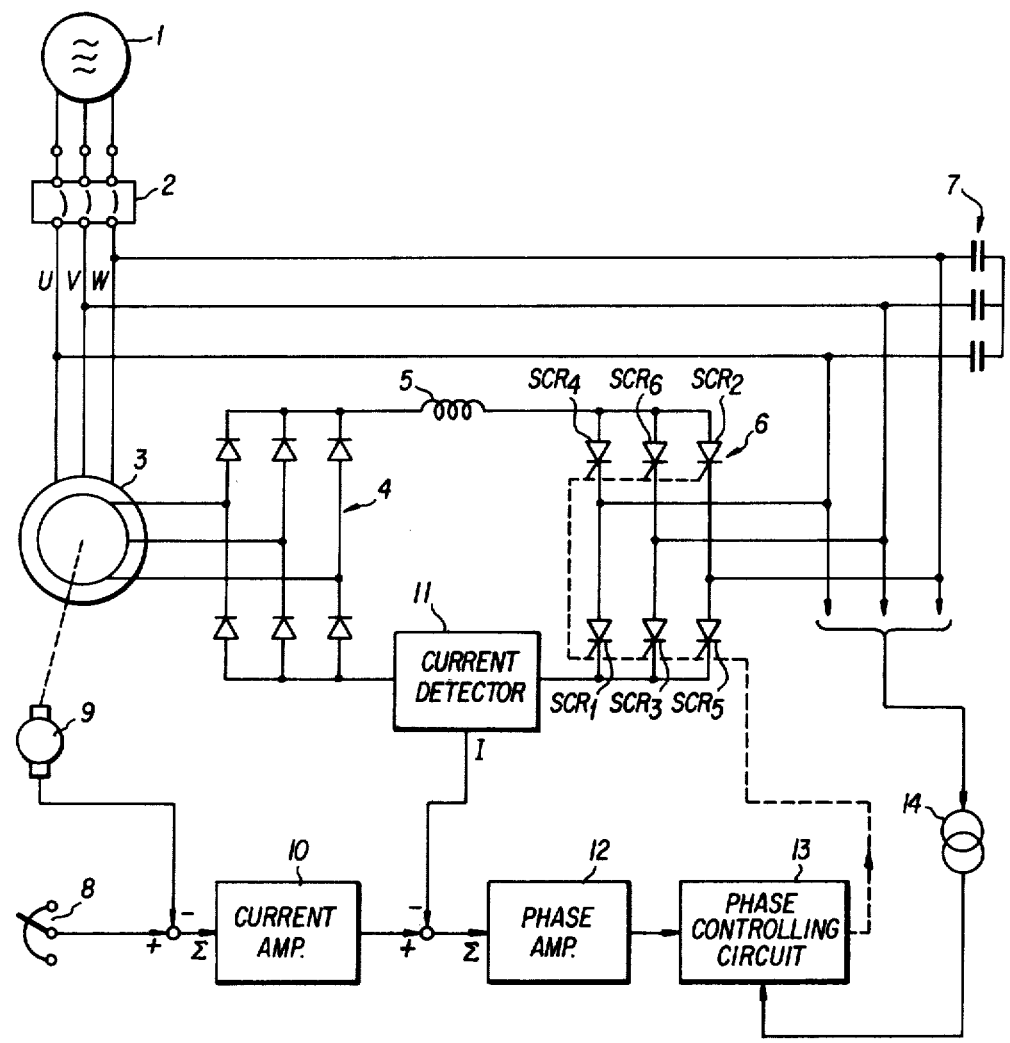
FIG. 1 is a circuit diagram of a conventional static Scherbius device.
Figure 2:
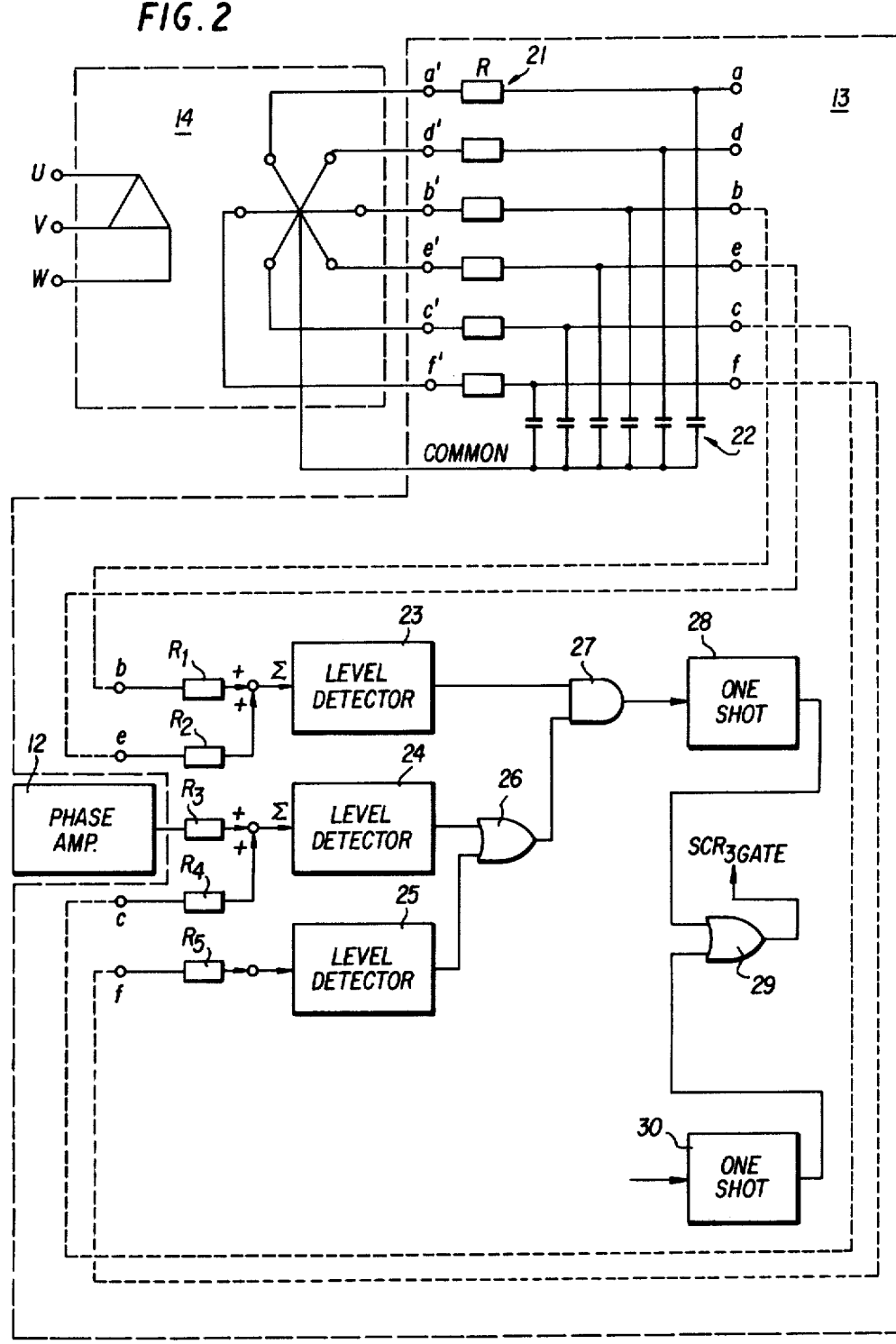
FIG. 2 is a circuit diagram of a phase controlling circuit as shown in FIG. 1.
Figure 3:
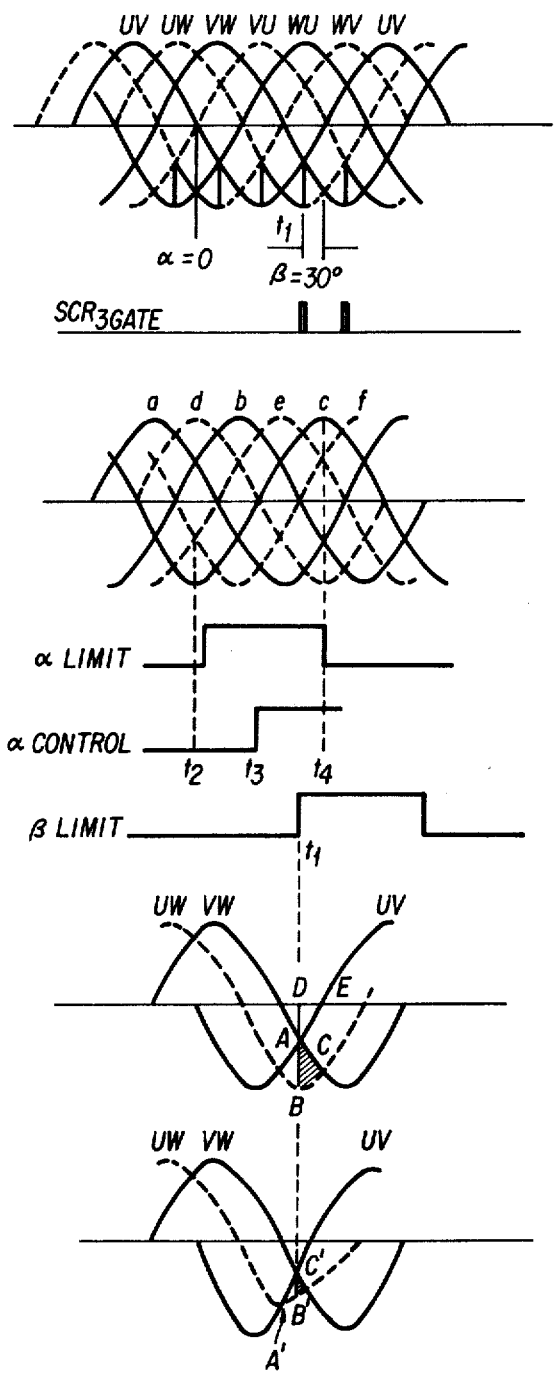
FIG. 3 is a time chart illustrating the operations of each part shown in FIG. 2.

In addition, since the other parts not shown in FIG. 4 are the same as the parts shown in FIG. 2, the explanation of these parts is deleted.

Figure 5:
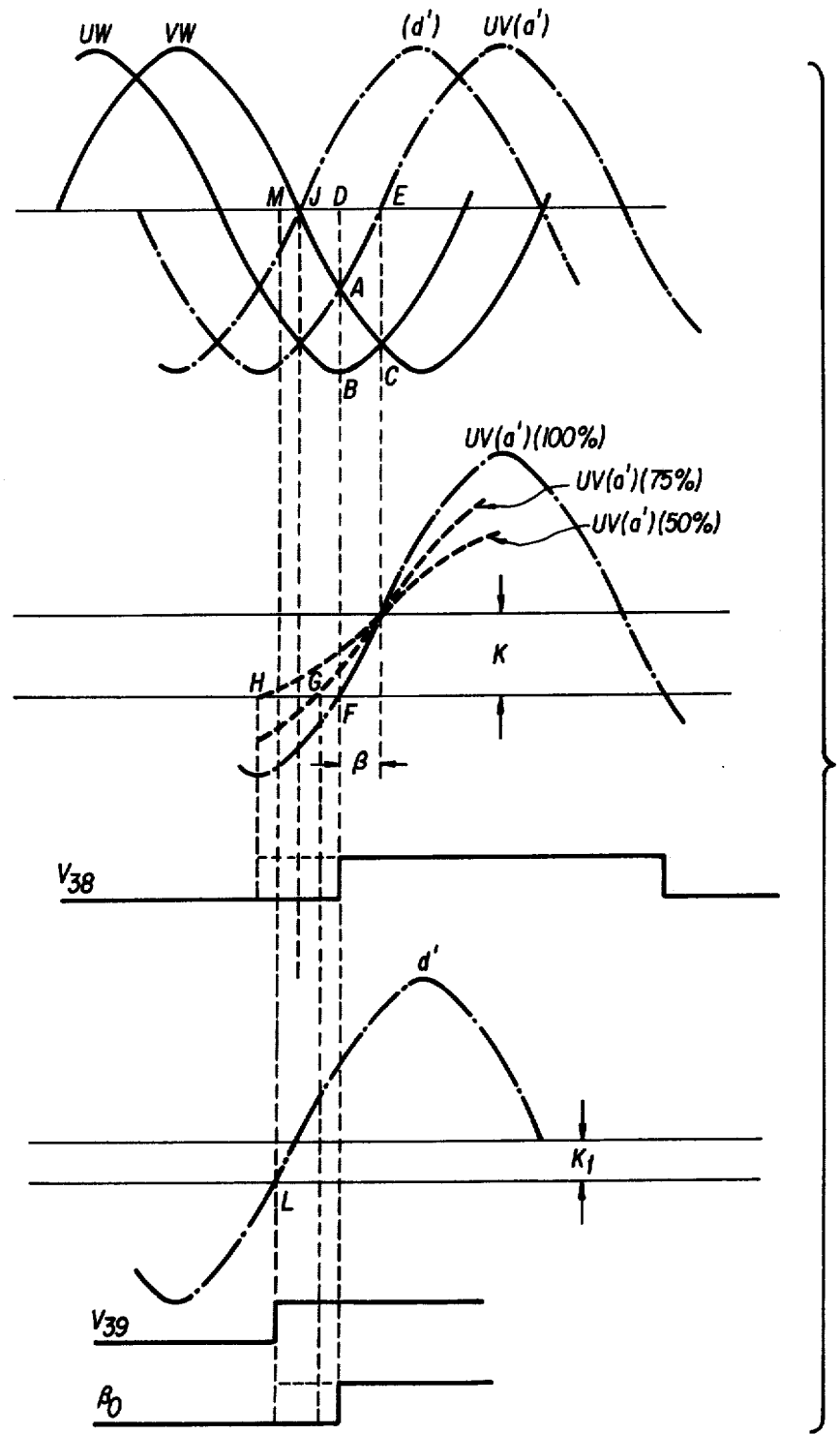
FIG. 5 is a time chart illustrating the operations of each part shown in FIG. 4.

The voltage signal a' of the transformer 14 shown in FIG. 2 is supplied to the level detector 38 through the resistor 33 as a signal for detecting the commutating voltage. A positive voltage which is set by adjusting a variable resistor 34 is supplied to the level detector 38 to set the threshold level K shown in FIG. 5. The output signal $V_{38}$ of the level detector 38, therefore, produces the logic "1" at the point F (FIG. 5). If the voltage of the A.C. power source drops to 75% and 50%, as shown at the dotted lines, the crossing point with the level K is moved to the points G and H respectively. Accordingly, the output signal $V_{38}$ of the level detector 38 is moved toward the direction of the leading phase. On the other hand, the voltage signal d' from the transformer 14 is supplied to a level detector 39 through a resistor 36 to limit the output signal $V_{38}$. The positive voltage which is set by adjusting a variable resistor 37 also is applied to the level detector 39 through a resistor 41 to set the threshold level $K_1$ as shown in FIG. 5. The output signal $V_{39}$ of the level detector 39 produces the logic "1" at the point L shown in FIG. 5. As shown in FIG. 4, the $\beta$ limit angle is determined by the output signal $\beta_0$ from an AND circuit 40 in response to the output singals $V_{38}$ and $V_{39}$ of the level detectors 38 and 39.

In FIG. 5, even though the voltage of the A.C. power source is dropped or changed, since the commutating voltage is the amplitude A-B=D-A in the case when the waveform of the three-phase input is normal, it is possible to sufficiently commutate the inverter circuit 6 provided that the $\beta$ limit angle can be controlled so as to maintain the amplitude D-A of the commutating voltage at a predetermined amplitude. For example, as shown in the sinewave line UV(a')(75%) of FIG. 5, if it is assumed that the voltage of the A.C. power source drops to about 75%, that $\beta$ limit angle (i.e., output signal $V_{38}$) is extended from the point F to the point G. Accordingly, it is possible to commutate the inverter bridge circuit 6 since the commutating begins at the same voltage as in the normal state. On the other hand, since in the circuit for controlling the $\beta$ limit angle, the $\beta$ limit angle is extended in response to the reduced voltage of the A.C. power source, the output signal $V_{39}$ of the level detector 39 serves to prevent the $\beta$ limit angle from being over-increased or over-extended. Namely, although the $\beta$ limit angle can vary from the point E ($\beta$ limit angle=0) to the point H and more as shown in FIG. 5, the $\beta$ limit angle is limited at the point M (M=L) due to the function of the level detector 39. The two reasons that the extension of the $\beta$ limit angle is limited are so as not to exceed the operating range ($\beta$=90°)of the inverter circuit and so that a certain degree of the inverter voltage from the inverter can be produced.

It should be now apparent that in accordance with the teachings of this invention even though the voltage of the A.C. power source drops, since control of the commutating angle is achieved such that the same amplitude of the commutating voltage as that of normal state occurs, the failure of commutator can be prevented. Moreover, since the inverting voltage can be generated without the failure of commutation when the A.C. power source is simultaneously stopped in the Scherbius device according to this invention, it is possible to cut off the inverting current and to wait for the recovery of the A.C. power source.

Obviously, many modifications and variations of this invention are possible in light of the teachings of the present invention. It is therefore to be understood that within the scope of the appended claims, the invention may be practiced otherwise than as specifically described herein.

What is claimed as new and desired to be secured by Letters Patent of the United States is:

1. A separate excitation type inverter device including an A.C. bridge circuit in which an A.C. power source is used as a commutating source, wherein D.C. power is returned to the A.C. power source by an inverter bridge circuit, said device comprising:
   means for converting the A.C. power source into six phase components;
   a control circuit for controlling the commutating angle of the inverter bridge circuit by combining selected of said phase components to produce control signals based on selected combinations of said phase components, wherein said control signals are used for controlling the inverter bridge circuit commutating angle;
   first means for setting a first predetermined level of voltage;
   second means for setting a second predetermined level of voltage;
   first means for comparing the output of said converting means with the output of said first voltage setting means;
   second means for comparing the output of said converting means with the output of said second voltage setting means;
   means for adding the outputs of said first and second comparing means; and
   means for combining the output of the adding means with the control signals produced by the combination of said phase components such that the commutating angle of said inverter device is also controlled in response to the output of said adding means.

2. A separate excitation type inverter device according to Claim 1, wherein the means for converting comprises:
   a transformer which is connected with the A.C. power source and which produces six phase voltage components; and
   means for delaying the six phase outputs of the transformer at predetermined phase angles.

3. A separate excitation type inverter device according to claim 2, wherein:
   the means for delaying is an RC filter network.

4. A separate excitation type inverter device according to claim 1, further comprising:
   a first level detector provided between the output of said first comparing means and said adding means; and
   a second level detector provided between the output of said second comparing means and said adding means.

5. A separate excitation type inverter device according to claim 1, wherein:
   the output of said second comparing means functions to limit the operation of the inverter within the operable range of the inverter.

6. A separate excitation type inverter device according to claim 5, wherein:
   the operable range of the inverter is 90°.

7. A static Scherbius device in which the secondary winding of an induction motor is connected with a power source through a power converter having a plurality of controllable semiconductor devices, said power source being connected with the primary winding of the induction motor, wherein power from the motor secondary winding is returned to the power source by the semiconductor devices, said static Scherbius device comprising:
   means for converting the A.C. power source into six phase components;
   a control circuit for controlling the commutating angle of said semiconductor device by combining selected of said phase components to produce control signals based on selected combinations of said phase components, said control signals used for controlling the commutating angle of said semiconductor devices;
   first means for setting a first predetermined level of voltage;
   second means for setting a second predetermined level of voltage;
   first means for comparing selected phase compoonents at the output of said converting means with the output of said second voltage setting means;
   second means for comparing selected phase components at the output of said converting means with the output of said second voltage setting means;
   means for adding the outputs of said first and second comparing means; and
   means for combining the output of the adding means with the control signals produced by the combination of said phase components such that the commutating angle of said Scherbius device is also controlled in response to the output of said adding means.

* * * * *